June 14, 1960   T. N. DE PEW   2,940,706
PALLET TIERING FRAMES

Filed March 10, 1958   2 Sheets-Sheet 1

INVENTOR.
THOMAS N. DE PEW
BY *Ralph W Kalish*

ATTORNEY

June 14, 1960 T. N. DE PEW 2,940,706
PALLET TIERING FRAMES
Filed March 10, 1958 2 Sheets-Sheet 2

INVENTOR.
THOMAS N. DE PEW
BY
ATTORNEY

2,940,706
Patented June 14, 1960

2,940,706
PALLET TIERING FRAMES

Thomas N. De Pew, University City, Mo., assignor to Arrowhead Products, Inc., St. Louis, Mo., a corporation of Arkansas Filed Mar. 10, 1958, Ser. No. 720,460

6 Claims. (Cl. 248—120)

This invention relates in general to pallet tiering frames and, more particularly, to a unitary, three-posted frame for detachable engagement on conventional storage pallets. This application is an improvement of the co-pending joint application of Thomas N. De Pew and Richard H. Heise, Serial No. 548,097, filed November 21, 1955, now Patent No. 2,828,933.

It is an object of the present invention to provide a pallet tiering frame comprising a unitary structure having three uprights with means for readily detachable snap-fitting engagement upon storage pallets.

It is a further object of the present invention to provide a pallet tiering frame comprising a unitary structure having a substantially three-sided top member for receiving superimposed loads in a stable, balanced manner.

It is an additional object of the present invention to provide a pallet tiering frame of unitary, integrated construction, which may be adapted for releasably engaging the deckboards of a storage pallet in different manners for accommodating various pallet designs.

It is an additional object of the present invention to provide a pallet tiering frame of the type stated which may be manufactured most economically; which does not require the utilization of extraneous means for mounting upon, or dismounting from, pallets; and which is sturdy, reliable, and durable in usage.

Other objects and details of the invention will be apparent from the following description, when read in connection with the accompanying drawings (2 sheets) wherein:

Figure 1 and Figure 3 are illustrated.

Figure 1:
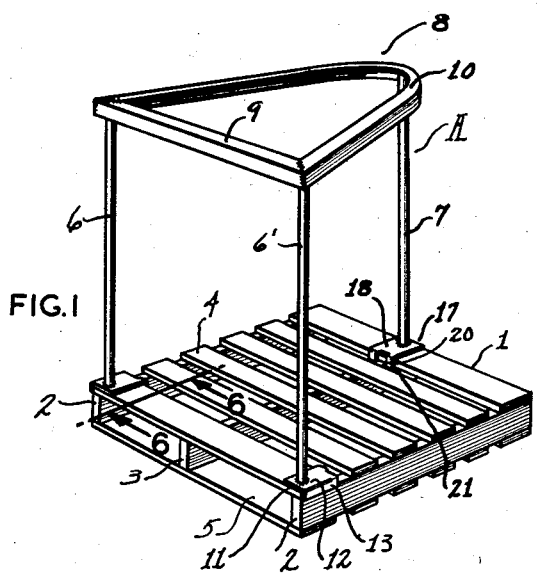
Figure 1 is a perspective view of a pallet tiering frame constructed in accordance with and embodying the present invention showing the same in mounted position upon a storage pallet.

In the drawings, 1 designates a conventional storage pallet having parallel side or outer stringers 2, a central or inner stringer 3, and upper and lower decks or platforms comprised of spaced parallel boards 4, 5, respectively, in axially normal relationship to stringers 2, 3 and being suitably secured thereto, as by nails. It is to be pointed out that pallet 1 is not considered a part of the present invention, but is merely representative of storage pallets in general, and although being illustrated as of the double-deck, flush-stringer type, may, if desired, be of other well-known designs, as more fully developed in the aforesaid co-pending application Serial No. 548,097.

Provided for detachable installation upon pallet 1 is a tiering frame, indicated A, comprising a pair of corner posts or uprights 6, 6' and a center post 7; said posts 6, 6' being located at adjacent corners of pallet 1 and post 7 being presented substantially intermediate the end of pallet 1 parallel to the pallet end between post 6, 6'. Said posts 6, 6', 7 may be any suitable material, but preferably, of pipe stock. Fixed upon the upper ends of posts 6, 6', 7, in substantial planar parallel relation to the upper face of pallet 1, is an open-frame, generally triangular-shaped top member 8, as of angle stock, pipe, or the like, integrally comprising a rectilinear portion 9 extending between corner posts 6, 6' and connected at its ends to the ends of a generally curvilinear or elliptic portion 10 the mid-point of which is secured upon the upper end of the centerpost 7; the central arcuate section of said curvilinear portion 10 being such as to overlie portions of pallet 1 between centerpost 7 and the adjacent side edges of said pallet 1 so that the area of top member 8 is greater than the area defined by posts 6, 6' and 7. Therefore, a relatively increased support is provided for loads superimposed upon pallet tiering frame A.

Figure 2:
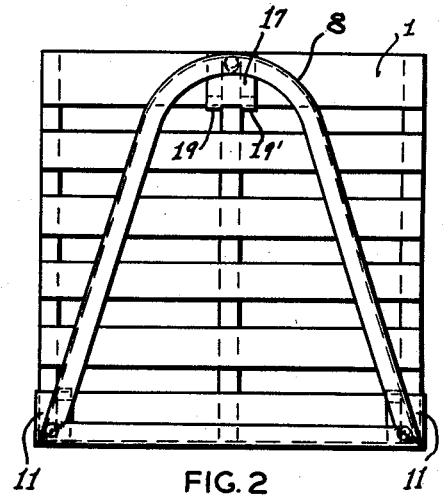
Figure 2 is a top plan view.
Figure 6:
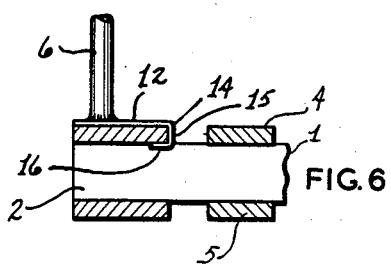
Figure 6 is a vertical transverse section taken on the line 6—6 of Figure 1.
Figure 7:
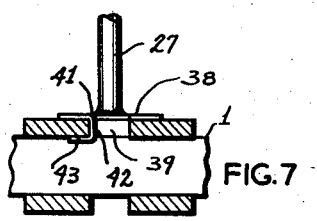
Figure 7 is a vertical transverse section taken on the line 7—7 of Figure 3.

Corner posts 6, 6' each carry at their lower ends a foot member 11 for readily releasable engagement at opposite ends of an end upper deckboard 4; such foot members 11 being of the type more fully described in the aforesaid co-pending application Serial No. 548,097, comprise a flat plate 12 having a length substantially equivalent to the width of the upper end deckboards 4 for flatwise disposition on the upper end surface thereof; and along one margin is provided with a downturned flange 13 for abutment against the outwardly presented end face of the respective end deckboard 4. On its inwardly directed side, plate 12 is formed to present a locking toe 14 spaced inwardly from flange 13 (see Figure 6) which consists of a depending section 15, lying in a plane perpendicular to that of flange 13, which at its lower end is bent under plate 12 to define a distal section 16. The constituents of toe 14 are sized for gripping the related deckboard 4 and distal section 16 is presented at an angle to depending section 15 of slightly greater than 90 degrees so that a range of thickness of deckboards may be accommodated. With respect to frame A illustrated in Figures 1 and 2, it will be seen that the locking toes 14 of foot members 11 of each post 6, 6' are presented in what might be termed side by side, parallel relationship with the depending sections 15 being co-planar, whereby said foot members 11 are adapted to engage the opposite end portions of the same deckboard.

Centerpost 7 carries at its lower end a foot member 17 comprising a flat plate 18 for disposition upon the upper surface of the upper deckboard 4 at the end of pallet 1 opposite to that on which corner posts 6, 6' are positionable, and at substantially the mid-point thereof. Said plate 18 at its inner edge integrally includes a pair of spaced locking toes 19, 19' of the same structural character as locking toes 14, each having a depending section and a lower distal section 20, 21, respectively, for engaging the inner side edge of the related deckboard. Said locking toes 19, 19' are spaced apart a distance substantially equal to the thickness of the adjacent central stringer 3 for straddling the same with confronting lateral faces of each toe abutting against opposite side faces of said stringer.

Corner posts 6, 6' and centerpost 7 are resilient about their point of attachment to top member 8 and are normally biased outwardly so that in detached or dismounted state will, at their lower ends, be disposed beyond the proximate end edges of pallet 1. Therefore, in order to mount tiering frame A upon pallet 1 it is requisite that each post 6, 6', 7 be subjected to an inwardly directed, compressive force for presenting the locking toes of their respective foot members for engagement upon the related end deckboard.

When tiering frame A is in mounted position, the various posts thereof will be stressed, being urged endwise of pallet 1 through their inherent resiliency which stress will be counteracted by the engagement of the locking toes upon the respective deckboards so that said posts will be rigid and stable. Furthermore, it will be noted that any tendency of corner posts 6, 6' toward the adjacent sides of pallet 1 due to any superimposed load upon frame A will be resisted by the abutment of the outer side faces of locking toes 14 against the inner face of the proximate side stringer 2, whereby lateral stability of frame A is assured.

Posts 6, 6' and 7 are slightly canted so that the same will incline downwardly and outwardly from top member 8. Such canting provides a further rigidifying factor by enhancing the resistance of frame A to any outwardly directed forces of supported loads.

Frame A, hence, constitutes a simple yet highly efficient tiering frame of one-part or unitary construction, being fully integrated into a single, durable, self-sufficient structure, necessitating no extraneous devices or tools for engagement upon, and disengagement from, pallets, nor the interconnection with additional elements for operability. The springing, or snapping, of the various foot members onto pallet 1 may be easily accomplished by an average unskilled workman through the application of pressure, as by the foot, against posts 6, 6', 7, to force same into position to allow the desired engagement of the locking toes.

Figure 3:
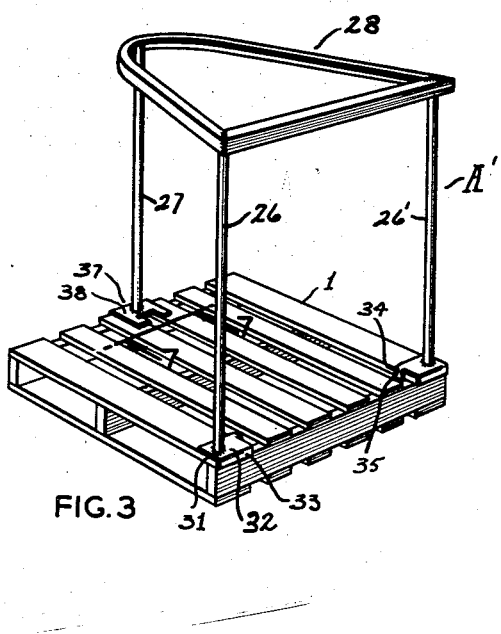
Figure 3 is a perspective view of another form of pallet tiering frame constructed in accordance with and embodying the present invention, showing the same as mounted upon a storage pallet.
Figure 4:
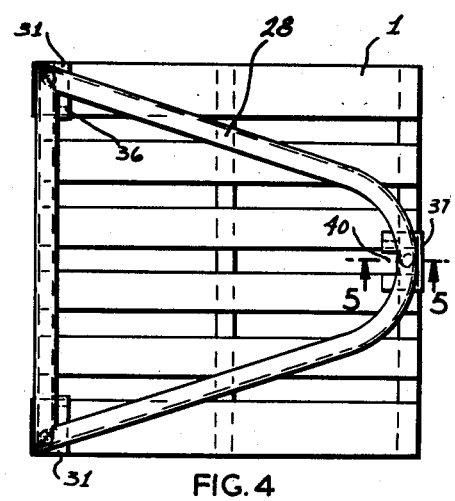
Figure 4 is a top plan view of the form of pallet tiering frame shown in Figure 3.
Figure 5:
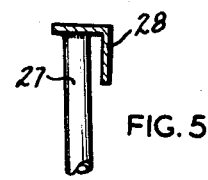
Figure 5 is a fragmentary vertical transverse section taken on the line 5—5 of Figure 4.

Illustrated in Figure 3 is another form of pallet tiering frame, indicated A', which incorporates corner posts 26, 26', a center post 27 and a top member 28, said elements being in all respects substantially identical to posts 6, 6', 7 and top member 8, respectively, of frame A hereinabove described. Each corner post 26, 26' mounts at its lower end a foot member 31 having a flat plate 32, a depending flange 33, and a locking toe 34, which elements are substantially identical to the foot member 11, plate 12, flange 13, and locking toe 14 described hereinabove with respect to pallet tiering frame A. However, said foot members 31 are related to their respective corner posts 26, 26' for engaging end portions of deckboards at the opposite ends of pallet 1, rather than the same deckboard as in the case of frame A, so that the depending sections 35 of each locking toe 34 are in confronting relationship with the related distal sections 36 being bent in opposite directions with respect to each other.

Center posts 27 will thus be presented at substantially the mid-point of the opposite side of pallet 1 and aligned with an opening or spacing between deckboards. For secure installation upon pallet 1, post 27 carries at its lower end a foot member 37 which comprises a flat plate 38 having a length greater than the space between the adjacent deckboards for purposes of bridging such space and along its outer edge is provided with a depending flange 39 for abutment against the outer end faces of the related deckboards, while centrally on its inner edge plate 38 is cut-a-way to provide a recess 40 substantially equal in width to the space intervening the proximate deckboards. Along one side edge of said recess there is formed a locking toe 41 having a depending section 42 and distal section 43 for grippingly engaging the proximate lateral edge of one of the adjacent or center deck boards; locking toe 41 being of similar construction to locking toes 34 and 14 hereinabove described.

Posts 26, 26' are also resilient with respect to top member 10 and are urged outwardly or endwise of pallet 1, away from each other, so that the same must be forced inwardly toward each other to bring locking toes 34 into engagement with the opposite end deckboards upon release of pressure. Similarly, center post 27 must be forced inwardly to effect engagement of locking toe 41 as said post is allowed to spring outwardly under release of such pressure.

It will be observed that tiering frame A' is adapted for disposition upon pallets in 90 degree relationship to pallet tiering frames A. Pallet tiering frames A' are designed primarily for use upon pallets of the type wherein the transverse center-line of the pallet passes through an inter-deckboard spacing.

Figure 8:
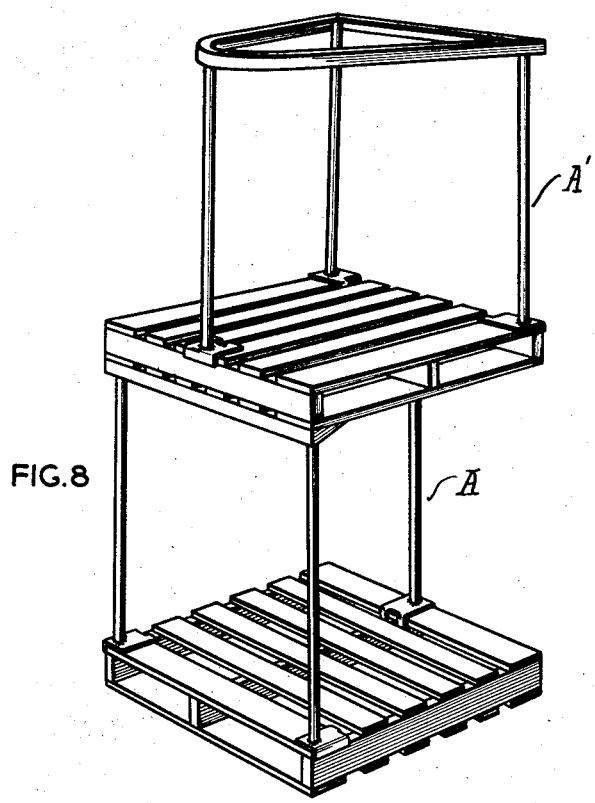
Figure 8 is a perspective view of pallets tiered by the frames of the present invention, wherein the forms shown in both

In actual usage, for maximum stability, the tiering frames of the present invention are preferably disposed in an alternatingly reverse manner within a single tier so that one one level the corner posts will be to one side of the tier while on the immediate tier thereabove the corner posts will be at the opposite side of the tier, all as suggested in Figure 8. However, Figure 8, for purposes of illustratiion only, shows both forms of the present invention, but it is not the intention that frames A and A' should be so utilized since either type may be used exclusively within a particular tier, or both may be used dependingly solely upon the availability of tiering frames at a particular storage area and the types of pallets used.

Although the top members 8, 28 discussed hereinabove comprise what has been referred to as a rectilinear portion and a curvilinear or elliptic portion, formed of generally three-sided open frame device, the same may be constructed in slightly varying fashions without in any way exceeding the bounds of this inventive concept. Thus, the top members may be of a complete annular or ring-like design with the posts being presented at points 120 degrees from each other, and similarly, such top members may be in actual triangular formation, comprising three rectilinear legs adjoining each other at their ends in the formation of relatively well-defined angles.

It should be understood that changes and modifications in the formation, construction, arrangement, and combination of the several parts of the pallet tiering frames may be made and substituted for these herein shown and described without departing from the nature and principle of my invention.

Having thus described my invention, what I claim and desire to secure by Letters Patent is:

1. A tiering frame for use with storage pallets comprising three posts, two of said posts being located at adjacent corners of a pallet and the other post being presented at substantially intermediate the ends of the side edge of the pallet opposite the side between the corner posts; a generally three-sided top member fixed upon the upper ends of said posts, and means at the lower ends of each of said posts for detachable engagement upon a pallet, said top member extending from one side of the engaged pallet to the other and providing a support surface for another pallet to present same in tiered relationship to the engaged pallet.

2. A pallet tiering frame as described in claim 1 wherein the top member is of open frame construction having a generally rectilinear portion extending between the corner posts, and a curvilinear portion connecting the ends of the rectilinear portion with the center post.

3. A pallet tiering frame as described in claim 1 wherein the posts are resilient with respect to their points of securement to the top member being normally biased at their lower ends in a direction outwardly of the adjacent edge portion of the pallet for inwardly compressive movement for presenting the pallet engaging means for securement upon the pallet.

4. A pallet tiering frame as described in claim 1 wherein the posts are resilient with respect to their points of securement to the top member being normally biased at their lower ends outwardly of the adjacent edge portion of a pallet for inwardly compressive movement for presenting the pallet engaging means for securement upon the pallet, and wherein the corner posts are biased in mutually opposite directions and perpendicular to the direction of bias of said other post.

5. A pallet tiering frame as described in claim 1 wherein the posts are resilient with respect to their points of securement to the top member being normally biased at their lower ends outwardly of the adjacent edge portion of a pallet for inwardly compressive movement for presenting the pallet engaging means for securement upon the pallet, and wherein the corner posts are biased in the same direction and opposite to the direction of bias of the other post.

6. A tiering frame for use with storage pallets having a plurality of spaced-apart, parallel stringers and a series of deckboards, axially normal to said stringers and secured upon at least one edge of said stringers to define a storage surface comprising three spaced-apart uprights, a generally three-sided open frame, continuous top member presented in planar-parallel relationship to the storage surface of one pallet and extending from one side thereof to the opposite side for forming a support surface for another pallet, thereby to dispose same in tiered relation to the aforesaid one pallet, said uprights being fixed at their upper ends to said top member and being free throughout their extent from the point of securement to said top member, said uprights further being resilient about their respective securement to said top member and having a normal bias at their lower ends outwardly of the adjacent portion of the engaged pallet, two of said uprights being disposed for disposition at adjacent corners of a pallet and the other of said uprights being presented for disposition centrally of the side of the pallet opposite that extending between the two corner uprights, and detachable engaging means provided at the lower ends of each of the uprights for engagement with a deckboard of the pallet, said resiliency of said uprights causing the application of inwardly directed compressive movement of said uprights for presenting the detachable engaging means for securement upon the related deckboard of the pallet.

References Cited in the file of this patent
UNITED STATES PATENTS

| | | |
|---|---|---|
| 1,374,633 | Boyle | Apr. 12, 1921 |
| 1,716,868 | Stephens | June 11, 1929 |
| 2,495,711 | Fletcher | Jan. 31, 1950 |
| 2,579,685 | Loose | Dec. 25, 1951 |
| 2,700,520 | Skubic | Jan. 26, 1955 |
| 2,828,933 | De Pew | Apr. 1, 1958 |

OTHER REFERENCES

"National Pallets," advertisement in Modern Materials Handling, July 1949. (Copy Div. 52.)